(12) United States Patent
Kretz et al.

(10) Patent No.: US 8,289,469 B2
(45) Date of Patent: Oct. 16, 2012

(54) LIQUID CRYSTAL SCREEN

(75) Inventors: Prénoms Thierry Kretz, Ville (FR);
Bernard Meunier, Saint Etienne de Saint Geoirs (FR)

(73) Assignee: Thales, Neuilly-sur-Seine (FR)

( * ) Notice: Subject to any disclaimer, the term of this patent is extended or adjusted under 35 U.S.C. 154(b) by 317 days.

(21) Appl. No.: 12/739,935

(22) PCT Filed: Oct. 31, 2008

(86) PCT No.: PCT/EP2008/064778
§ 371 (c)(1),
(2), (4) Date: May 27, 2010

(87) PCT Pub. No.: WO2009/056621
PCT Pub. Date: May 7, 2009

(65) Prior Publication Data
US 2010/0253873 A1 Oct. 7, 2010

(30) Foreign Application Priority Data
Oct. 31, 2007 (FR) ..................... 07 07675

(51) Int. Cl.
*G02F 1/1335* (2006.01)
(52) U.S. Cl. .............. 349/58; 349/64; 349/96; 349/122; 349/161
(58) Field of Classification Search .............. 349/58, 349/60, 64, 96, 122, 161; 361/679.02, 679.21, 361/679.22, 679.26, 679.27
See application file for complete search history.

(56) References Cited

U.S. PATENT DOCUMENTS

| 4,061,418 | A | 12/1977 | Poensgen |
| 4,508,428 | A | 4/1985 | Harada |
| 7,131,623 | B2 | 11/2006 | Alric et al. |
| 7,542,105 | B2 * | 6/2009 | Sato et al. ...................... 349/58 |
| 7,724,317 | B2 * | 5/2010 | Kim et al. ...................... 349/58 |

FOREIGN PATENT DOCUMENTS

| DE | 25 44 940 A1 | 9/1977 |
| EP | 1 519 219 A2 | 3/2005 |
| FR | 2 798 478 A1 | 3/2001 |
| JP | 55-93127 A | 7/1980 |
| JP | 55-138715 A | 10/1980 |
| JP | 2004-157471 A | 6/2004 |
| WO | 02/16083 A1 | 2/2002 |

* cited by examiner

*Primary Examiner* — Dung Nguyen
*Assistant Examiner* — Tai Duong
(74) *Attorney, Agent, or Firm* — Baker & Hostetler LLP

(57) ABSTRACT

An LCD screen comprises an optical stack of at least one optical film against the rear polarizer placed at the rear of the plate of the LCD module. That face of the optical film overlaid against the polarizer is rough. A bead of glue is dispensed over the thickness of the rim of the stack over the whole of its perimeter. Depending on whether or not the polarizer is of the hardened type, the screen is encapsulated in a mechanical structure comprising an outer frame and an inner frame clamping the plate and the rear polarizer or the plate alone, the bead of glue being dispensed in the space between the inner frame and the stack.

12 Claims, 5 Drawing Sheets

LIQUID CRYSTAL SCREEN

CROSS-REFERENCE TO RELATED APPLICATIONS

This application is a National Stage of International patent application PCT/EP2008/064778, filed on Oct. 31, 2008, which claims priority to foreign French patent application No. FR 07 07675, filed on Oct. 31, 2007, the disclosures of which are incorporated by reference in their entirety.

FIELD OF THE INVENTION

The present invention relates to a liquid crystal screen and more particularly to the rear structure of this screen allowing improved encapsulation.

BACKGROUND OF THE INVENTION

Producers of LCD screens supply these screens to users who will integrate them into an end product, such as an instrument board or a portable device for example. The screens are supplied encapsulated in a rigid mechanical structure forming a frame.

FIG. 1 illustrates an example of rear encapsulation of an LCD screen. The example represented corresponds to a basic configuration comprising a frame 10 clenching an LCD cell, that is to say a plate 1 and a backplate 2 assembled in a leaktight manner so as to form a cavity containing the liquid crystal XL, between the two plates, and two polarizers assembled (or more exactly laminated), each by gluing: a front polarizer 3 laminated on the backplate 2 and a rear polarizer 4 laminated on the plate 1.

The plate 1 is larger than the backplate 2, thus offering a peripheral zone 1a overhanging the backplate. This peripheral zone is clamped between an outer frame 10.a and an inner frame 10.b which form the mechanical structure 10 for encapsulating the screen. At the front face A there is usually a seal j between the outer frame and the front face of the plate 1, in the peripheral zone 1a. At the rear face B it is ordinarily a spacer 12 which is used between the inner frame 10.b and the rear plane of the cell. International patent application WO 02/16083 shows another mechanical structure in which the module is pinched by way of two elastic seals.

When a rear polarizer 4 of the type that is not hardened to storage in damp heat is used, the polarizer on plate assemblage is sensitive to dampness. For these reasons, a rear encapsulation structure is provided, configured to make this assemblage leaktight right around the whole cell. This encapsulation structure thus comprises, in addition to the inner frame 10.b and the spacer 12, a transparent slide of substantially the same dimension as the plate, typically a glass slide 13, combined with a dual-face adhesive frame 14 placed between the plate 1 and this glass slide 13: the plate, the slide and the adhesive frame form a leaktight cavity in which the polarizer is enclosed: under these conditions, the rear polarizer 4 is set back by a width d1 from the edge of the plate 13 and the glass slide 13, that is to say its surface is substantially smaller than that of the plate and of the slide.

The adhesive frame used is of VHB ("Very High Bonding") type, that is to say highly adhesive. It is disposed at the plate and/or slide edge, and has a width d2 that is smaller than the setback d1. It has a thickness e2 which ensures a spacing of a few hundred micrometers between the glass slide 13 and the polarizer 4. This spacing is necessary so as to avoid contacts between the two opposing planes 4 and 13, which contacts would have as undesirable optical effects, the formation of interference fringes. The spacer 12 is pinched between the inner frame 10.b and the rear face of the glass slide 13. It has substantially the same width as the adhesive frame.

Depending on the purpose of the product and the optical qualities sought, it may be necessary to integrate additional optical functions at the rear, such as for example a diffuser, or optical flux amplifier, or prepolarizer function, etc. This can be done easily in the configuration described, by inserting other additional optical films at the rear face of the polarizer, in the space 5 between the glass slide 13 and the polarizer 4. For example, a diffuser 200 is illustrated in FIG. 1. This diffuser is integrated in a floating manner,—that is to say it is not glued to either plane of the polarizer 4 or slide 13; it "floats" in the air gap between the polarizer 4 and the glass slide 13. The diffuser can also be laminated on the rear slide so as to prevent it from floating in the cavity and therefore from crinkling in a thermal environment.

A rear encapsulation such as this exhibits the necessary mechanical, optical and leaktightness conditions. Notably, leaktightness is ensured by the VHB adhesive frame: the term "frame" signifying that the adhesive is continuous over the whole of the perimeter of the cell.

However, it exhibits various drawbacks:
  the VHB frame has a high manufacturing cost: indeed, the frame is made by removing the central material from a sheet of adhesive material: the whole of this central portion is lost.
  the VHB frame uses the peripheral edge 1a of the plate 1, outside of the active optical zone Z of the cell. The width e2 of the VHB frame depends on the width of this zone. This characteristic prevents the use of certain off-the-shelf cheap LCD cells in which the plate and the backplate are cut flush with the active zone on two sides at least. This is an inconvenient limitation since it is increasingly sought, even in constraining applications of avionics type, to use off-the-shelf components termed COTS, to reduce costs. In other cells, the peripheral zone is very narrow, too narrow to make a VHB frame of sufficient width to guarantee leaktightness. Typically below about three millimeters, a VHB frame is not leaktight. To this difficulty is added those of making and manipulating an overly slender VHB frame.
  the air gap in the space 5 between the polarizer 4 and the glass slide 13 gives rise to high sensitivity of the LCD screen to variations in atmospheric pressure. The greater the distance between the two planes 4 and 13, the greater is this sensitivity. This sensitivity to pressure variation is very inconvenient for LCD screens dedicated to avionic applications, with risks either of opening during large pressure variations, or of bonding of smooth interfaces (rear shim with polarizer or DBEF, diffuser with rear shim, etc.)
  according to the screen's storage conditions, an optical film such as 200, placed at the rear of the cell in the space 5 between the two planes 4 and 12, may crinkle. At the optical level, crinkling results in non-uniformities of the LCD back-lighting and therefore degraded image quality.
  repair, for example to replace the crinkled film, requires the dismantling of the mechanical structure.

For these various reasons, a rear polarizer 4 of the type hardened to storage in damp heat is preferably used, thereby making it possible to circumvent the problems of leaktightness at the rear plate/polarizer interface, and therefore of the glass slide plus adhesive frame mechanical structure of FIG. 1: the hardened polarizer 4 can be made over the whole extent of the plate 1, as illustrated in FIG. 2. The plate and polarizer assembly can then be pinched directly between the outer frame 10.a and the inner frame 10.b, via the seal j at the front face and the spacer 12 at the rear face, since there is no problem of leaktightness at the plate 1 and rear polarizer 4 interface. The spacer 12 can bear directly against the rear face of the polarizer 4.

Depending on the purpose of the product and the optical qualities sought, or in order to perfect the optical properties of the screen, it may be necessary to integrate additional optical functions at the rear face, such as for example a diffusing function or optical flux amplifier. In the configuration of FIG. 2, the integration of an optical film 200 is done by overlaying the film against the rear polarizer 4. However, as the polarizer exhibits a smooth rear surface, this can only be done by using an optical film exhibiting a nonzero surface roughness, as taught in the U.S. Pat. No. 4,508,428. The necessary roughness is obtained by appropriate treatment of the surface, by any known technique, and for example, in the case of a diffuser made of PMMA (PolyMethyl MethAcrylate, a thermoplastic of the plexiglass type): molding of the part in a structured mold, embossing, chemical or physical etching, etc. Otherwise, if the optical film also exhibits a smooth surface, the assemblage would introduce cosmetic defects such as interference or Newton's rings.

The polarizer 4/diffuser 200 stack simplifies the encapsulation of the LCD module in the mechanical structure 10, since the assembly can be clamped, via the seal and the spacer, between the outer frame and the inner frame without any additional mechanical element, and without any adhesive frame, unlike the encapsulation illustrated in FIG. 1.

However, it has been possible to observe in practice that liquid manages to infiltrate by capillarity at the interface of the diffuser 200 and polarizer 4 planes, through the rim of the cell. Liquid can thus be trapped between the two planes of the contacting surfaces of the diffuser and of the polarizer, as illustrated in FIG. 3. This liquid trapped at various places o1, o2 then gives rise to defects of non-uniformity of illumination. Once trapped, the liquid cannot easily evaporate. Even drying the screen may leave traces of dried water and/or water residues, which will have the same unacceptable optical effects.

More generally, as it may be beneficial to integrate several optical films at the rear, each ensuring a particular optical functionality, the problem of the leaktightness of the interface arises each time.

Finally, the replacement of an optical film exhibiting a defect necessarily requires the dismantling of the mechanical structure, which is not desirable.

SUMMARY OF THE INVENTION

The subject of the invention is an LCD screen with a configuration of the optical film or films at the rear face of the polarizer which facilitates encapsulation with the sought-after qualities.

The object of the invention is to solve a technical encapsulation problem that may be formulated as follows: to propose an inexpensive rear encapsulation structure that is simple to implement, resistant to variations in atmospheric pressure and has no leaktightness problems for an LCD module comprising at least one optical film at the rear of the polarizer; a structure which can be used whatever the damp-environment storage qualities of the polarizer; a structure which can be altered, allowing the integration of other optical functionalities (DBEF, BEF, holographic diffuser, diffuser, etc.) at the rear of the cell while still complying with the conditions enumerated above.

The invention therefore relates to an LCD screen comprising an LCD module, with a polarizer at the rear face of a plate of the module. The module comprises an optical stack at the rear face of the polarizer, set back from a spacer disposed to the rear of the module, around its perimeter, said stack comprising at least one optical film overlaid against said polarizer, at least one of the faces overlaid one against the other of said film and of the polarizer, being of nonzero surface roughness, and in that a bead of glue is dispensed over the rim of the stack over the whole of its perimeter in the space delimited between the spacer and the stack.

BRIEF DESCRIPTION OF THE DRAWINGS

Other advantages and characteristics of the invention are detailed in the following description with reference to the illustrated drawings of an embodiment of the invention, given by way of nonlimiting example. In these drawings.

DETAILED DESCRIPTION

Figure 1:
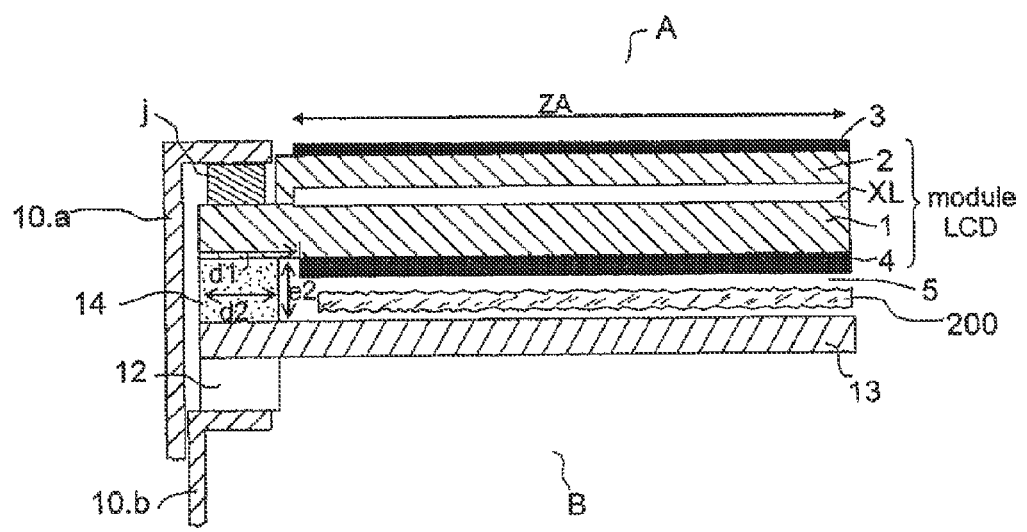
FIG. 1 is a partial sectional view of a liquid-crystal module encapsulated in a frame, in accordance with a first mode of rear encapsulation.
Figure 2:
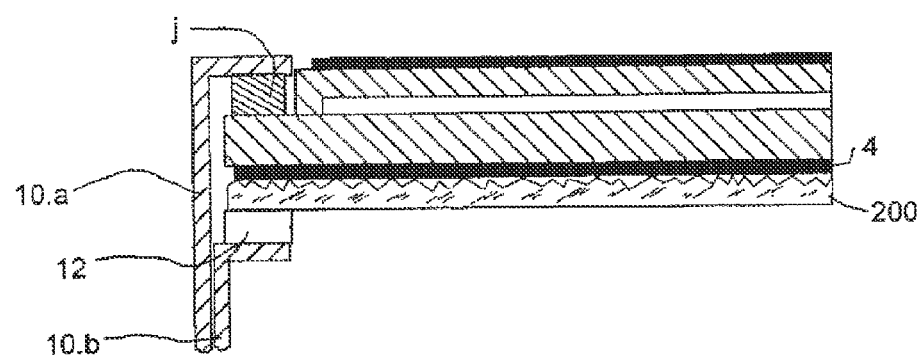
FIG. 2 is a partial sectional view of a liquid-crystal module encapsulated in a frame, presenting a second mode of rear encapsulation.
Figure 3:
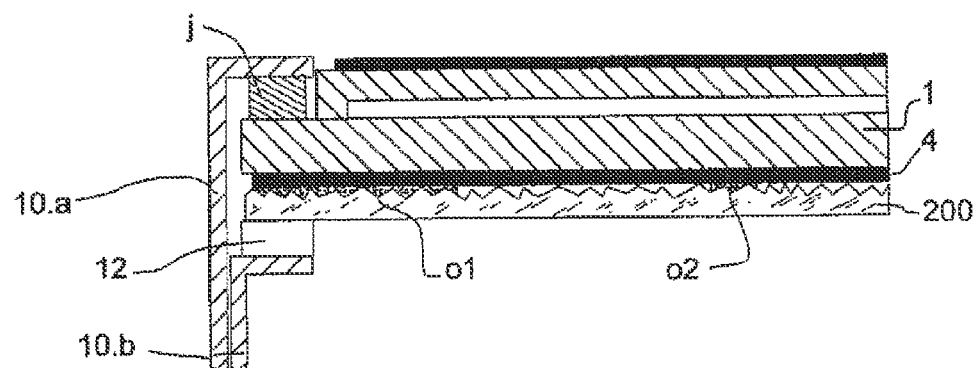
FIG. 3 illustrates the problem of water infiltration with an encapsulation in accordance with FIG. 2.

In the application, the following meanings are intended:
by LCD module, the assembly formed of the LCD cell and of its front and rear polarizers, and by plate, the plate of the LCD cell against which the rear polarizer is placed;
by rear polarizer 4 a pure polarizer, that is to say a polarizer which ensures only its polarization function, or else a polarizer combined with another optical function, for example an optical flux amplifier function, anti-reflection function or a function for limiting reflections of ambient light, obtained by lamination of a corresponding optical film, using a glue of suitable index, so as not to have any optical interference problem (Newton's Rings and/or interference fringes).
by rough surface of a film, a surface rendered non-smooth by any means, for example by working the surface (embossing, stamping, molding, etc.), or by addition of constituent, for example by mixing beads or fibers with the material before forming the film etc.

The proposal of the invention is to make at the rear face of the LCD module, a compact stack of a film or of several optical films against the rear face of the rear polarizer 4, the stack being set back from the edge of the plate 1, and of a spacer 12 disposed at the rear face of the module, around its perimeter, and made in such a way that a smooth face of the polarizer or of an optical film of the stack is always overlaid against a rough face of another film and a bead of glue dispensed over the rim of the stack, over the whole of its perimeter. It is also possible to have a polarizer with a rough face overlaid against a smooth face of an optical film.

In a variant the stack and the polarizer have the same dimensions and the bead of glue covers the rim of the stack and of the polarizer.

This bead of glue ensures several functions:
- a mechanical assemblage function making it possible to bind the stack to the LCD module,
- a function of insulation/leaktightness in relation to the outside of each interface: the interface between the polarizer and an optical film and the interface between two successive optical films,
- a mechanical function of damping the pressure variations making it possible to render the stack and the assemblage of the stack to the LCD module insensitive to variations in atmospheric pressure and notably to the strong decompressions undergone by LCD screens in an avionics environment.

In practice, the dispensation of glue is carried out in the following manner: the stack is overlaid mechanically against the smooth face of the polarizer 4 throughout the operation of dispensing and polymerizing the glue. In this way, the volume of air imprisoned in the stack and between the stack and the polarizer is minimized, thus helping to obtain an encapsulated screen that is insensitive to variations in atmospheric pressure; the thickness of glue is adjusted so that it isolates each of the interfaces in the stack and between the stack and the rear polarizer from the outside environment and therefore makes the whole structure leaktight against possible infiltrations; and the bead of glue makes it possible to bind the stack to the module. If the polarizer of the LCD module is unhardened, the bead of glue also covers the rim of the polarizer and makes the plate 1/polarizer 4 interface leaktight.

The invention thus enables an LCD screen to be made with a stack at the rear face which at one and the same time is compact, has no air gap, is resistant to variations in atmospheric pressure, has no optical defects of the Newton's ring or interference fringes type, and is leaktight.

Depending on whether or not a hardened polarizer is used, the encapsulation of such a screen is obtained in a simple manner in the first case, by clamping the plate 1 and the polarizer 4 via a seal j at the front face and the spacer 12 at the rear face, between the outer frame 10.a and the inner frame 10.b; in the second case only the plate 1 is clamped between the two frames via the seal j and the spacer 12.

The invention will now be illustrated with the aid of several embodiments.

Figure 4:
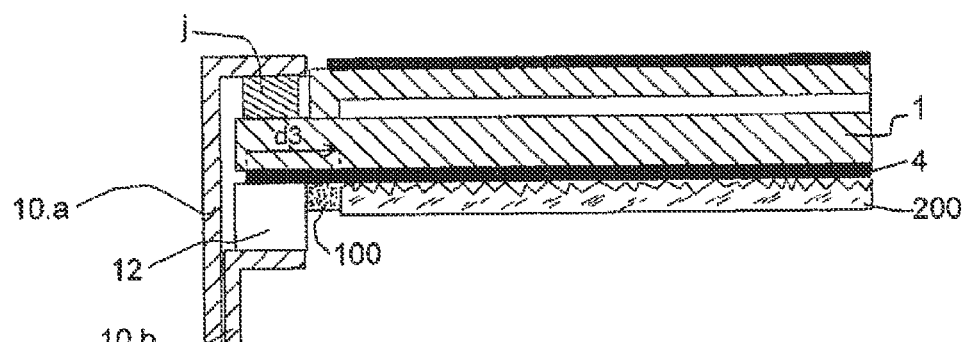
FIG. 4 illustrates in a partial sectional view, a first mode of rear encapsulation according to the invention.

FIG. 4 illustrates a first embodiment of an LCD screen comprising a diffuser optical film 200 at the rear of the LCD module, applicable in the case where the polarizer 4 at the rear of the LCD cell is of the type hardened to storage in a damp environment.

The polarizer 4 is dispensed over substantially the whole extent of the plate 1 of the cell. As indicated by way of preface, this is a pure polarizer or a polarizer combined with another optical function by lamination of an optical film, by means of a glue of suitable index (polarizer/DBEF for example). This known type of assemblage does not exhibit any leaktightness problem at the interface or at the rear of the film, or any optical interference problems.

The spacer 12 is overlaid against the rear polarizer 4, around the whole perimeter of the module.

The diffuser 200 is overlaid against the rear polarizer 4, but set back from the edge of the polarizer, by a distance d3, and set back from the spacer 12. It exhibits a rough surface which is overlaid against the smooth surface of the polarizer: in this way, there can be no generation of Newton's rings or interference fringes.

A bead of glue 100 is dispensed right around the whole diffuser, on its rim, covering the join of the diffuser and of the polarizer. As illustrated in FIG. 4, it is dispensed in the space delimited between the spacer 12 and the diffuser 200. The spacer thus serves as delimitation wall for the dispensing of the bead of glue 100.

This bead of glue ensures several functions:
- a mechanical assemblage function making it possible to bind the diffuser 200 to the remainder of the module,
- a function of isolating the plane of the diffuser/plane of the polarizer space from the outside, thus ensuring the leaktightness of the interface,
- a mechanical function of damping the pressure variations making it possible to render the module/polarizer/diffuser glued stack insensitive to pressure variations and notably to the strong decompressions undergone by LCD screens in an avionics environment.

The screen is encapsulated by pinching the plate 1 and the polarizer 4 in the mechanical structure 10.

Figure 5:
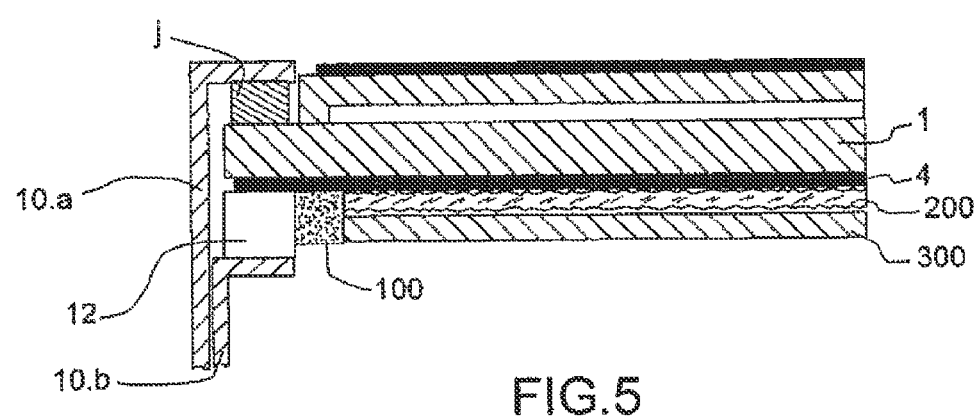
FIG. 5 illustrates a generalization of this mode of encapsulation, for an LCD module comprising an additional rear optical film.

FIG. 5 illustrates a second embodiment of the invention, which makes it possible advantageously to integrate a heater at the rear face, without being detrimental to the optical qualities of the screen. The stack comprises in the example an optical film 200, for example a diffuser, whose two faces are rough.

In a more detailed manner, the optical film 200 is then sandwiched between two smooth planes, that of the polarizer (or of the polarizer+a laminated DBEF film) and that of a transparent panel. This panel 300 can then advantageously be equipped with a heater, typically a heating resistor. The panel will for example be made of glass and more generally from a material which does not deteriorate with the temperature arising from the heater 300.

As in the embodiment of FIG. 4, the assembly comprising the optical stack comprising the diffuser 200, and the transparent panel 300, is made set back from the edge of the polarizer and the spacer.

The bead of glue is dispensed as previously indicated, in the space delimited between the spacer and the diffuser 200 and transparent panel 300 assembly, so as to obtain a thickness suitable for covering the two interfaces, viz. polarizer/optical film 200 and optical film 200/glass panel 300.

According to this embodiment, no liquid can infiltrate, even during storage in damp heat, between the smooth planes and the rough planes of the polarizer 4/film 200/glass shim 300 stack.

More generally, the optical stack can comprise several optical films overlaid one against another. The glass panel is then overlaid against the last optical film of the stack. The rear face of the last film of the optical stack against which the glass plate is overlaid then has nonzero surface roughness.

Figure 6:
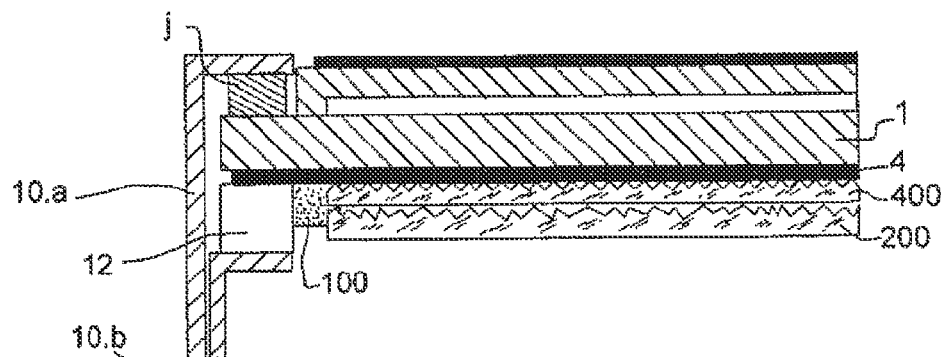
FIG. 6 illustrates a first variant of this mode of encapsulation.

FIG. 6 illustrates another embodiment of a screen, with a rear stack comprising no longer one but several optical films, in the example a diffuser 200 and a DBEF amplifying film 400. In the example the DBEF film is that which is placed right against the polarizer and the diffuser is placed against the DBEF film. Each film of the stack comprises at least one rough face, and the stack is made so that at each interface comprising a smooth face, the latter is necessarily overlaid against a rough face so that the stack cannot give rise to Newton's rings or interference fringes at any interface.

The bead of glue is dispensed as previously over substantially the whole thickness of the rim of the stack, so as to cover all the interfaces.

The embodiments described with reference to FIGS. 4 to 6, apply in the case where the polarizer is of the type hardened to storage in damp heat, so that it hugs substantially the whole surface of the plate 1 of the LCD module, and that it is clamped with this plate between the two frames of the mechanical structure 10. In these embodiments, and as illustrated in these figures, the spacer 12 on which the inner frame 10*b* of the mechanical structure 10 bears, is overlaid against the polarizer, the optical stack being made set back from this spacer.

Figure 7:
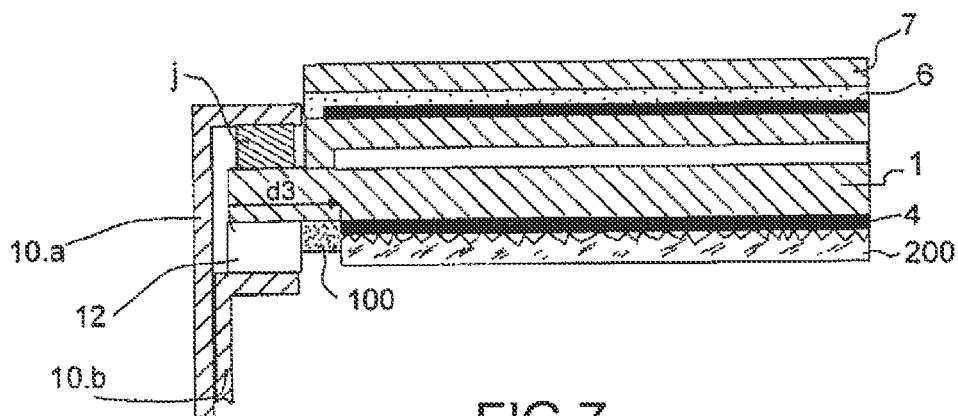
FIG. 7 illustrates a second variant of this mode of encapsulation.

In the case where the polarizer 4 is sensitive to the storage environment (damp heat), this being notably the case with off-the-shelf LCD modules (COTS components), it is necessary to dispose the polarizer 4 set back from the edge of the plate 1 and the spacer 12 as illustrated in FIG. 7, so as to ensure its leaktightness with the bead of glue. In this case, the bead of glue 100 is dispensed according to the invention, in the space delimited between the spacer and the polarizer plus optical stack assembly, and it covers the thickness of the stack and the polarizer. This is what is represented in FIG. 7. This figure also details a protection of the polarizer 3 at the front face when said polarizer is not of the hardened type, by a transparent slide, for example made of glass, assembled to the polarizer with glue 6 of suitable optical index ensuring protection of the front polarizer. The configuration at the rear of an LCD module made according to the invention can be altered and easily allows the integration of numerous optical functionalities (DBEF, BEF, holographic diffuser, etc.) at the rear of the cell while complying with the conditions enumerated above: stack of optical films on the polarizer with treatment of the surfaces of the films so as to never have two smooth surfaces overlaid one against the other, and bead of glue dispensed over the rim width of the stack ensuring adhesion of the stack to the module, its leaktightness and resistance of the stack to variations in atmospheric pressure.

This configuration furthermore facilitates the repair of a failed film of the stack: it suffices to remove the seal, in order to withdraw the stack, replace the failed film or films, or indeed the polarizer in the case where it is not hardened and reform the stack and overlay it against the polarizer 4 during the dispensing and the polymerization of the glue, all without touching the mechanical structure 10.

The use in all the embodiments of the invention of a spacer at the rear face of the module around its perimeter, with the optical stack made set back from the spacer, has several advantages.

Notably the proportions and the rigidity of such a spacer are controlled, thus offering a smooth and plane bearing surface, which allows easy clamping of the LCD module between two mechanical parts 10*a* and 10*b*, without any risk of cantilevering, in contradistinction to a module with no spacer, on which the optical stack would simply be stuck as taught for example in patent application JP 55 138715.

The disposition of the optical stack inside the interior space delimited by the spacer (with a setback typically of at least 0.5 mm on each side between the optical stack and the interior of the spacer) makes it possible:

to delimit the gluing zone to make the optical interfaces leaktight and mechanically hold the optical stack: the glue is dispensed over the rim of the stack, in the space between the spacer and the stack.

to easily re-work the optical stack, while keeping the LCD module mounted in its mechanics.

Figure 8:
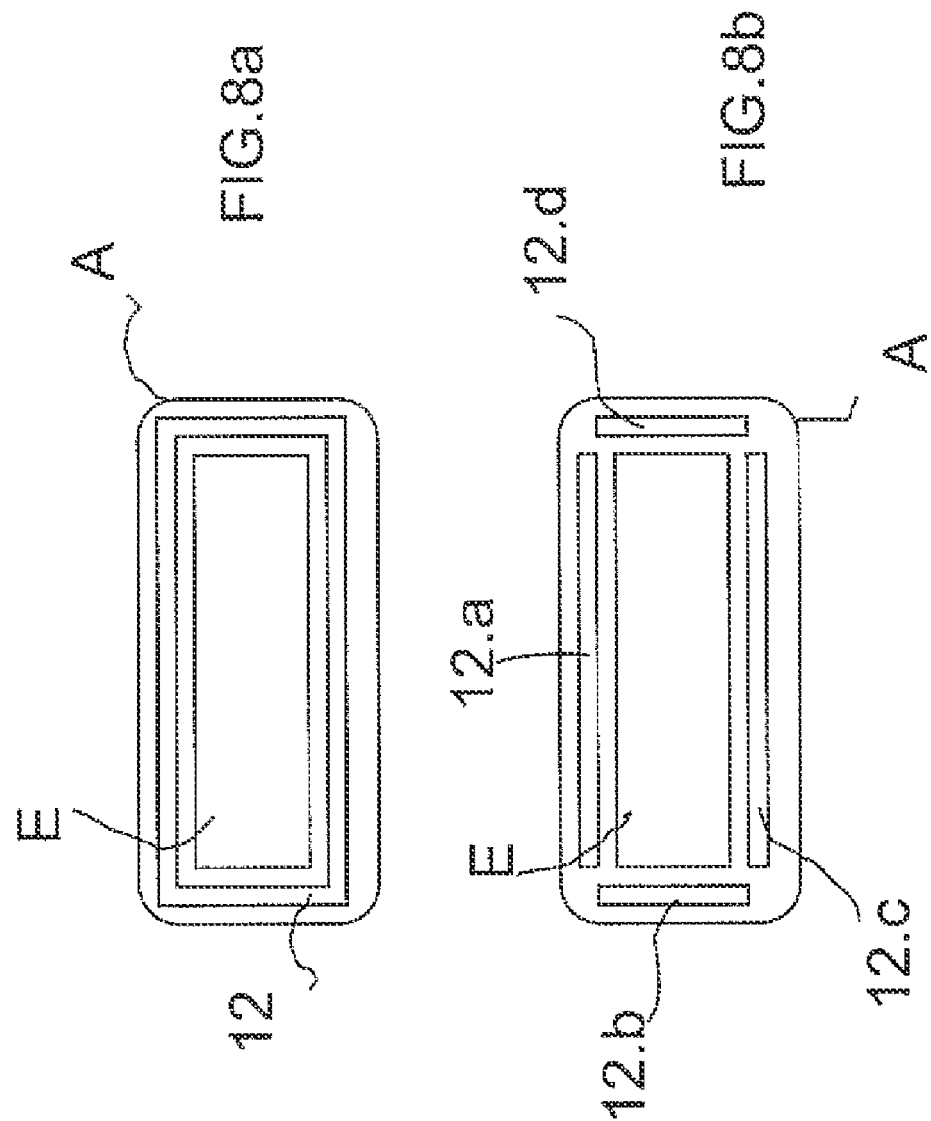
FIGS. 8a and 8b are schematic views of the rear face showing two variant embodiments of the spacer.

The spacer 12 can be a closed frame going right around the rear face A of the module as illustrated in FIG. 8*a*, or 4 bands 12.*a*, 12.*b*, 12.*c* and 12.*d* disposed on the 4 sides of this rear face of the module. These spacer bands have the same function of stop wall for the glue to be dispensed over the rim of the optical stack E and of bearing zones of controlled dimensions and rigidity. With the bands not touching one another in the corners, the glue can go beyond the spacer bands only at these places, this not being inconvenient. A banded spacer such as this is notably well suited to LCD screens with ground corners, for which a continuous spacer is more difficult to make.

Figure 9:
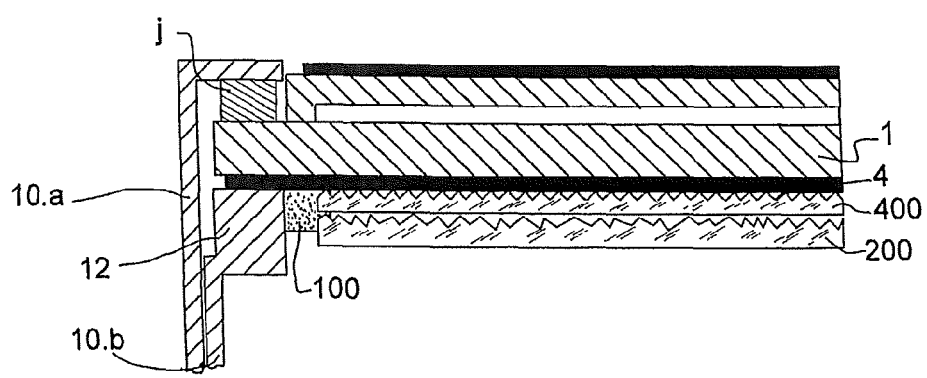
FIG. 9 illustrates a third variant of this mode of encapsulation.

In another variant embodiment as shown in FIG. 9, the spacer, continuous or banded, is embodied by the inner mechanical frame 10.*b* of the mechanical structure 10. This frame may be for example a part molded from plastic. If the profiles of FIGS. 4 to 6 are taken, this amounts to doing away with the line of separation between the inner frame 10.*b* and the spacer 12, so as to form one and the same part.

In a variant embodiment, the spacer is mechanically bonded to the module, typically by means of an adhesive placed between the spacer and the rear of the module (on the plate 1 or on the rear polarizer 4 depending on the embodiment). In the manufacturing process, provision is then made for a step of dispensing glue around the perimeter of the module, so as to glue the spacer or the spacer bands, or else the inner mechanical frame embodying the spacer as one and the same part.

It is then possible to deliver an LCD screen in this form with bonded spacer, it being up to the recipient of the product himself to mount the module in a final mechanical structure.

The invention claimed is:

1. An LCD screen comprising:
an LCD module with a polarizer at a rear face of a plate of the LCD module, and
a mechanical structure that comprises an inner frame and an outer frame, and further comprises a spacer disposed to a rear of the LCD module, around its perimeter, the LCD module and the spacer being clamped between said inner and outer frames, and an optical stack at the rear face of the polarizer, set back from the spacer, said optical stack comprising at least one optical film overlaid against said polarizer, at least one face of said at least one optical film overlaid against the polarizer being of nonzero surface roughness, a bead of glue being dispensed over a rim of the optical stack over the whole of its perimeter in a space delimited between the spacer and the optical stack.

2. The LCD screen as claimed in claim 1, wherein said optical stack comprises two or more optical films overlaid one against another, such that at each interface between two optical films, at least one optical film has a face of nonzero surface roughness.

3. The LCD screen as claimed in claim 1, wherein at least one optical film of the optical stack is a diffuser.

4. The LCD screen as claimed in claim 1, wherein said polarizer is a polarizer with additional optical function integrated by lamination of an optical film.

5. The LCD screen as claimed in claim 1, wherein the polarizer and the optical stack have substantially same dimensions, the set back with respect to the edge of the LCD module and of the spacer which is disposed against the rear face of the plate of the LCD module, and said bead of glue covers the rim of an assembly of the polarizer and of the optical stack, in the space delimited between the spacer and the polarizer plus optical stack assembly.

6. The LCD screen as claimed in claim 1, wherein the polarizer is of a type hardened to storage in damp heat, and substantially overlaps a surface of the plate of the LCD module, and the spacer is disposed against the rear face of said polarizer.

7. The LCD screen as claimed in claim 1, further comprises a glass panel that integrates a surface heater, said glass panel being overlaid against an optical film or a last optical film of the optical stack, that face of the optical film overlaid against the glass panel being of nonzero surface roughness.

8. The LCD screen as claimed in claim 1, wherein the spacer is a continuous part going right around the LCD module.

9. The LCD screen as claimed in claim 1, wherein the spacer is formed of four bands, one per side of the LCD module.

10. The LCD screen as claimed in claim 1, wherein the spacer is formed by said inner frame.

11. The LCD screen as claimed in claim 1, wherein said inner frame bears on the spacer.

12. The LCD screen as claimed in claim 1, wherein the spacer is attached securely to said LCD module, by an adhesive.

* * * * *

UNITED STATES PATENT AND TRADEMARK OFFICE
CERTIFICATE OF CORRECTION

PATENT NO. : 8,289,469 B2
APPLICATION NO. : 12/739935
DATED : October 16, 2012
INVENTOR(S) : Thierry Kretz and Bernard Meunier It is certified that error appears in the above-identified patent and that said Letters Patent is hereby corrected as shown below:

On the Title Page

Item (75), please change the first inventor's name from Prénoms Thierry Kretz to --Thierry Kretz--.

Item (75), please change the first inventor's city Ville to --Saint Jean de Moirans--.

Signed and Sealed this
Fourteenth Day of May, 2013

Teresa Stanek Rea
*Acting Director of the United States Patent and Trademark Office*